United States Patent [19]

Fisk

[11] 4,008,815
[45] Feb. 22, 1977

[54] REACTOR LOADING APPARATUS
[75] Inventor: Robert Walter Fisk, Sunnyvale, Calif.
[73] Assignee: Applied Materials, Inc., Palo Alto, Calif.
[22] Filed: Apr. 14, 1975
[21] Appl. No.: 567,634
[52] U.S. Cl. .............................. 214/17 C; 214/1 BB
[51] Int. Cl.² .......................................... B65G 49/00
[58] Field of Search ......... 214/26, 38 C, 730, 17 C, 214/1 BA, 1 BB, 23, 38 CC

[56] References Cited
UNITED STATES PATENTS

| | | | |
|---|---|---|---|
| 3,313,429 | 4/1967 | Cole | 214/38 C |
| 3,848,754 | 11/1974 | Bryntse | 214/730 |
| 3,853,230 | 12/1974 | Schultz | 214/38 C |
| 3,854,616 | 12/1974 | Willis et al. | 214/730 X |

Primary Examiner—Robert G. Sheridan
Attorney, Agent, or Firm—Flehr, Hohbach, Test, Albritton & Herbert

[57] ABSTRACT

Apparatus for transporting a susceptor carrying semiconductor wafers into and out of a horizontally extending reaction chamber. The apparatus comprises a traveling fork and carriage assembly pivotally mounted on a base for carrying the susceptor into and out of the reactor and lifting the susceptor between raised and lowered positions. Means is included for sensing the presence of a susceptor on the fork assembly and programming the apparatus accordingly for a loading or unloading operation.

13 Claims, 16 Drawing Figures

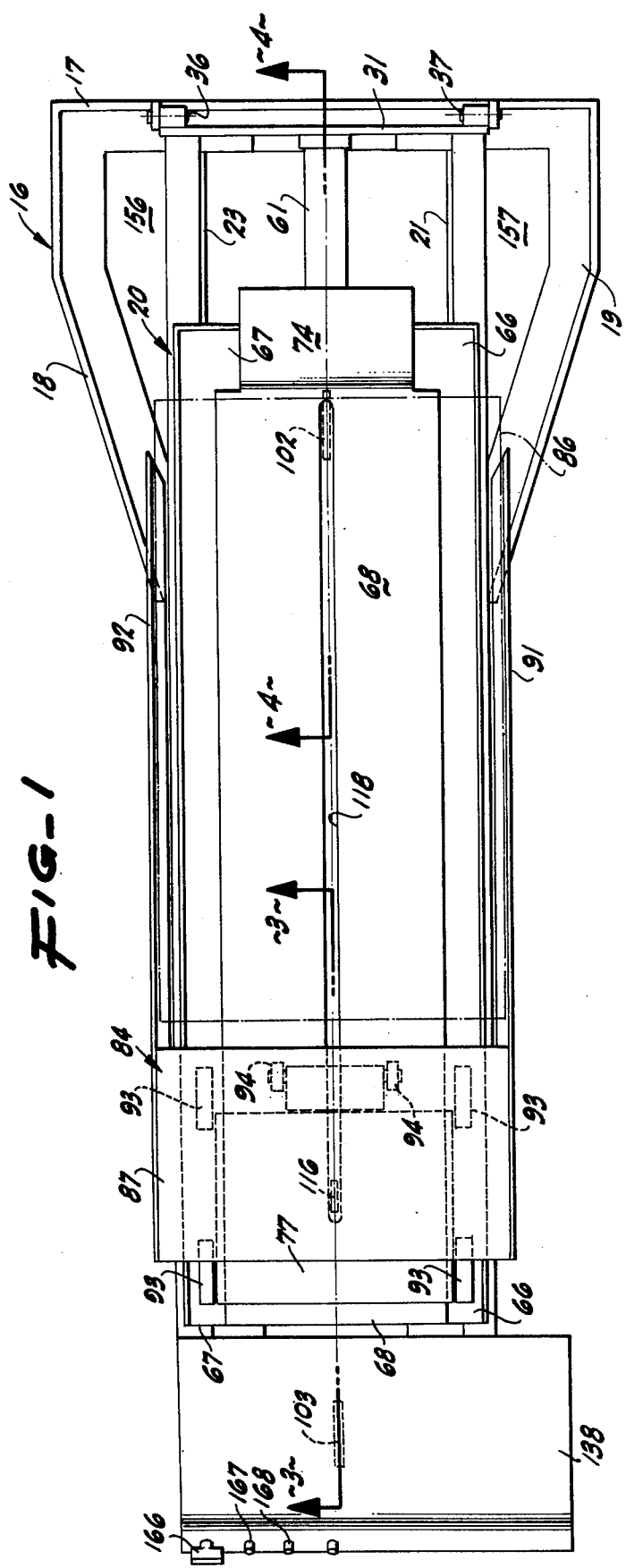

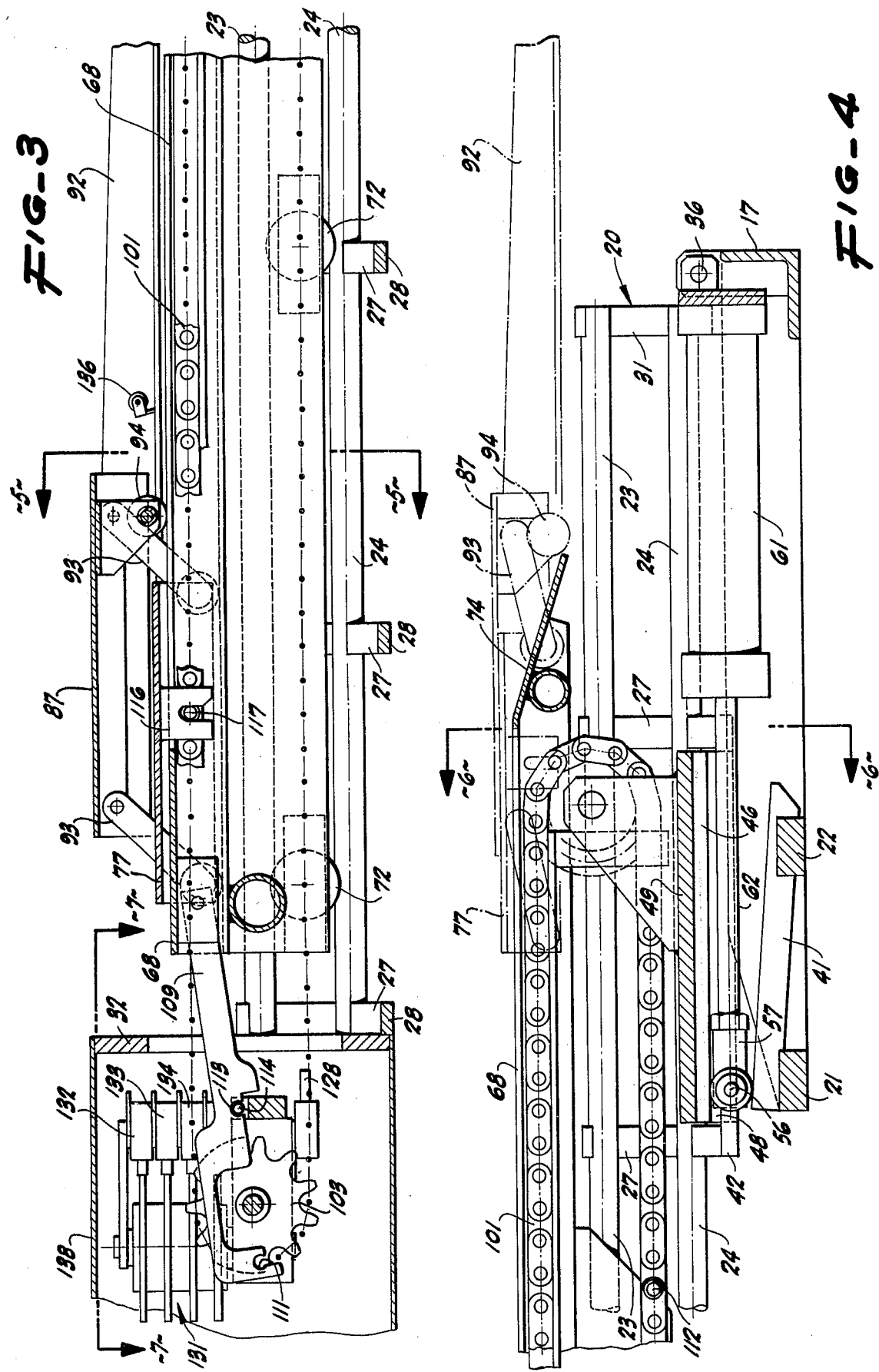

REACTOR LOADING APPARATUS

BACKGROUND OF THE INVENTION

This invention pertains generally to the manufacture of semiconductors and more particularly to apparatus suitable for loading a susceptor and wafers supported thereby into and out of a reaction chamber.

One type of chemical vapor deposition system used in the production of semiconductors is a reactor having a horizontally extending tube defining a reaction chamber. Such reactors are utilized, for example, in the deposition of silicon dioxide, silicon nitride, polycrystal silicon, and epitaxial silicon films. Horizontal tube reactors have a high wafer capacity and rapid cycle time, and they are particularly suitable for high volume wafer production.

Heretofore, horizontal tube reactors have been loaded manually, and the susceptor and a quartz sled on which the susceptor is mounted are typically withdrawn from the quartz reaction tube onto a loading dock using a pushrod. Wafers are loaded onto the susceptor, and the susceptor and sled assembly is pushed back into the reaction tube to a predetermined depth to align it with a suitable heat source.

As horizontal tube reactors have increased in size, the manual loading operation has become increasingly difficult. A modern high capacity reactor capable of handling a charge of 21 three inch diameter wafers typically uses a coated graphite susceptor weighing in excess of 11 lbs. The sliding friction between the quartz sled carrying such a susceptor and the bottom wall of the reactor tube is significant, and the abrasion between the two quartz elements produces quartz particles which interfere with high quality film growth. Moreover, axial and lateral positioning of the susceptor in the tube is difficult, and this makes it difficult to obtain repeatable susceptor temperature uniformity on a run-to-run basis.

Various attempts have been made to overcome these difficulties. For example, a thin Teflon sheet has been interposed betweeb the sled and the bottom wall of the tube. This makes insertion and removal of the susceptor relatively easy, but it introduces carbon contamination and requires a relatively cool susceptor. With today's rapid cycling in thin film growth, the loss of production time can be significant.

SUMMARY AND OBJECTS OF THE INVENTION

The invention provides apparatus for transporting objects into and out of chambers having openings of restricted height, and it is particularly suitable for loading and unloading a horizontal tube reactor without frictional contact with the tube walls. The apparatus comprises a traveling fork and carriage assembly pivotally mounted on a base for carrying the susceptor into and out of the reactor tube and lifting the susceptor between raised and lowered positions. Means is included for sensing the presence of a susceptor on the fork assembly and programing the apparatus accordingly for a loading or unloading operation.

It is in general an object of the invention to provide new and improved apparatus for transporting objects into and out of chambers having openings of restricted height.

Another object of the invention is to provide apparatus of the above character for loading and unloading a reactor having a horizontally extending reaction chamber.

Another object of the invention is to provide apparatus of the above character for loading and unloading a reactor having a horizontally extending reaction chamber.

Another object of the invention is to provide apparatus of the above character utilizing a telescoping carriage and fork assembly for carrying a susceptor and wafers into and out of the reaction chamber.

Additional objects and features of the invention will be apparent from the following description in which the preferred embodiment is described in detail in conjunction with the accompanying drawings.

BRIEF DESCRIPTION OF THE DRAWINGS

FIG. 1 is a top plan view of one embodiment of reactor loading apparatus according to the invention.

FIG. 2 is a side elevational view of the embodiment of FIG. 1.

FIG. 3 is an enlarged fragmentary sectional view taken along Line 3—3 of FIG. 1.

FIG. 4 is an enlarged fragmentary sectional view taken along Line 4—4 of FIG. 1.

DESCRIPTION OF THE PREFERRED EMBODIMENT

Figure 5:
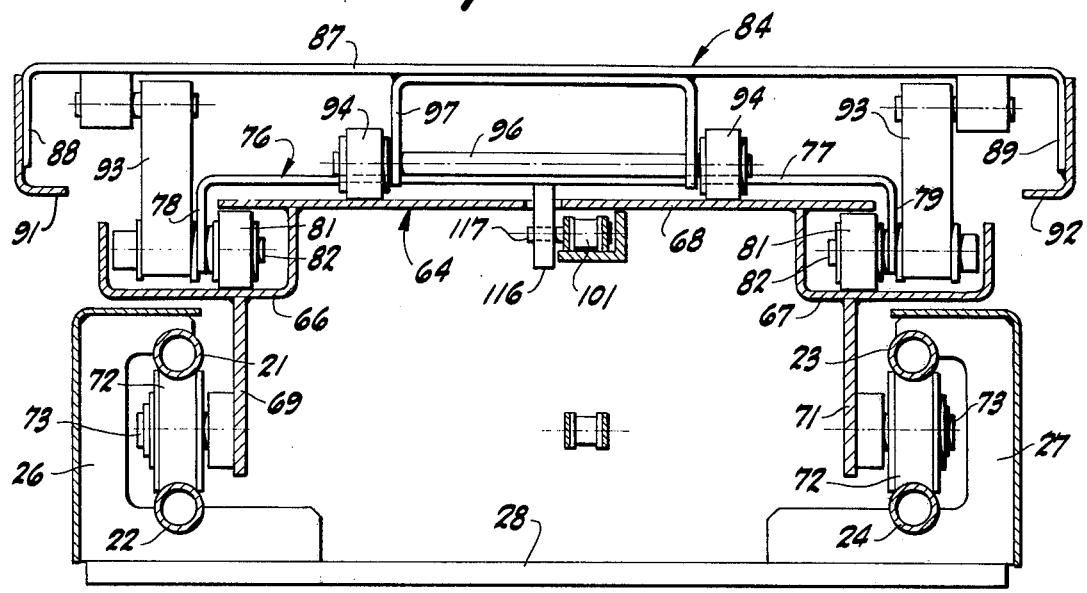
FIG. 5 is an enlarged cross sectional view taken along Line 5—5 of FIG. 3.
Figure 6:
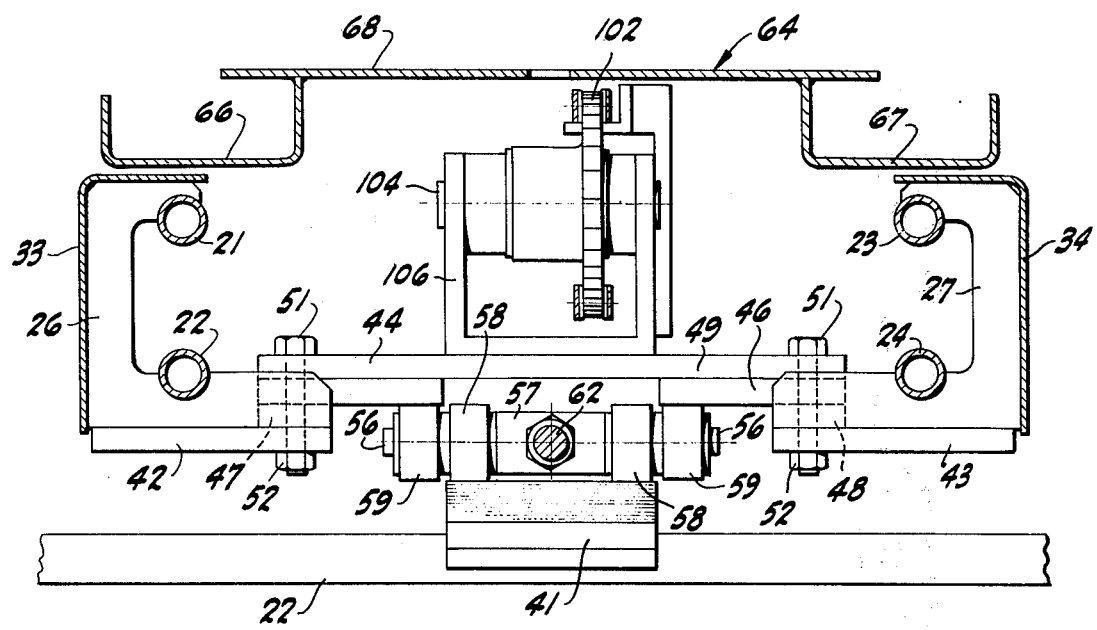
FIG. 6 is an enlarged cross sectional view taken along Line 6—6 of FIG. 4.
Figure 7:
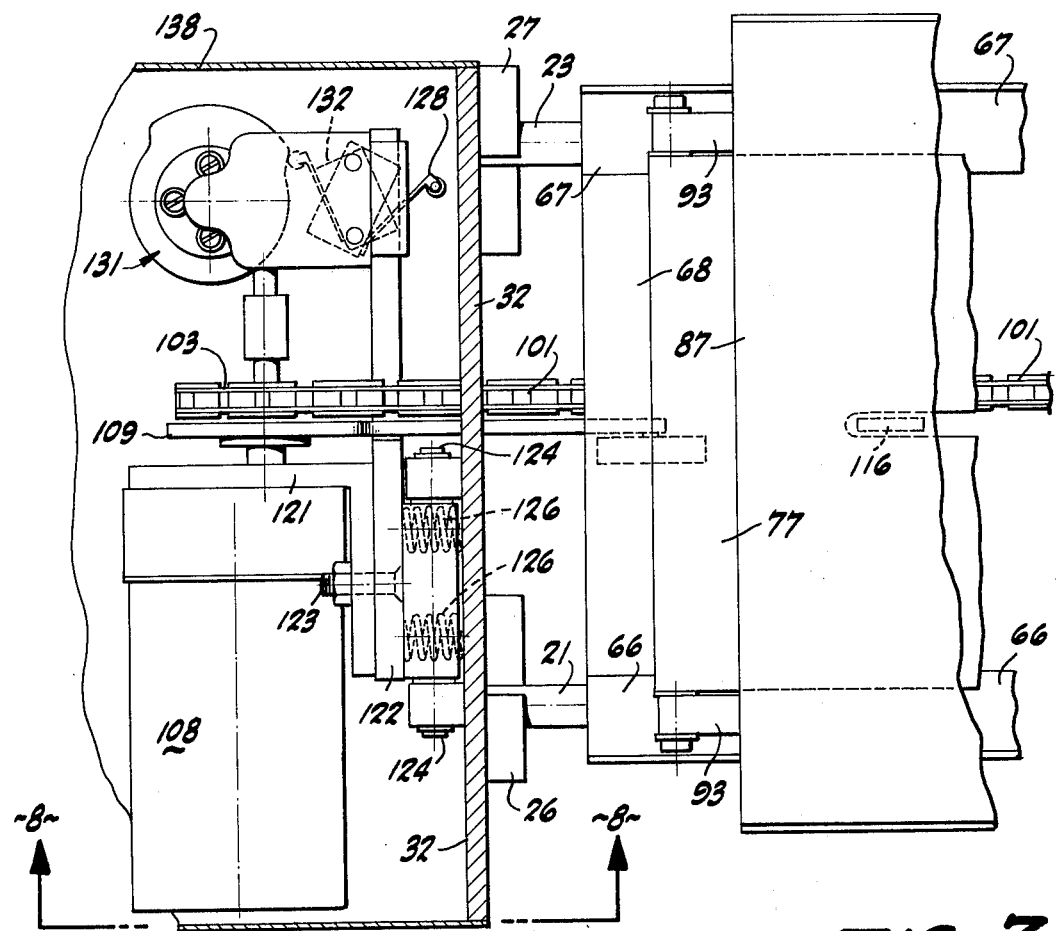
FIG. 7 is an enlarged cross sectional view taken along Line 7—7 of FIG. 3.
Figure 8:
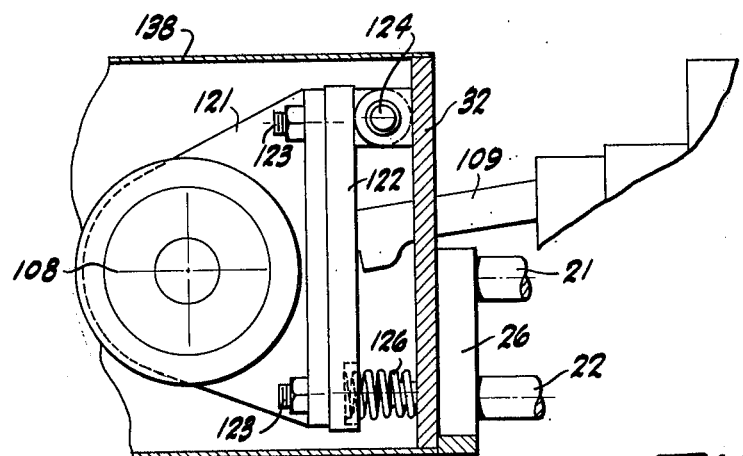
FIG. 8 is a fragmentary cross sectional view taken along Line 8—8 of FIG. 7.

The apparatus includes a base 16 which is adapted to be mounted in a fixed position relative to the reactor tube to be loaded and unloaded. In the embodiment illustrated, the base comprises a transverse front member 17 and side members 18, 19 fabricated of suitable angular stock. These members form a rigid unitary structure, and the rear portions of the side members are inclined inwardly, as best been in FIG. 1. Cross bars 21, 22 extend between the side members toward the rear of the base.

A truss-like framework 20 is mounted on base 16 and extends rearwardly therefrom generally in axial alignment with the reactor tube. The framework includes axially elongated rails 21–24 arranged in laterally spaced pairs. The rails in each pair are maintained in a vertically spaced apart relationship by C-shaped brackets 26 and 27 provided at axially spaced intervals on opposite sides of the framework. Brackets 26 and 27 are joined together by cross bars 28. Cross members 31, 32 are provided at the front and rear ends of the rails, and protective covers 33, 34 are mounted on rail brackets 26, 27 and extend axially to enclose each pair of rails from the top and outside.

Framework 20 is pivotally mounted on base 16 by pivot pins 36, 37 toward the ront of the base, and means is provided for pivoting the framework between raised and lowered positions relative to the base. This means includes an upwardly and rearwardly inclined ramp 41 which is mounted on cross bars 21, 22 of the base. Side plates 42, 43 extend axially between the two forward most rail brackets on each side of the framework, and ramp sections 44, 46 are mounted on the side plates and spaced thereabove by spacers 47, 48. A platform 49 is mounted above the ramp sections and extends laterally between the sections. The ramp sections, spacers, and platform 49 are affixed to side plates 42, 43 by bolts 51 and nuts 52.

An axle 56 mounted in a central housing 57 extends transversely of the framework and base. Rotatively mounted on the axle are inner wheels 58 which engage the upper surface of ramp 41 and outer wheels 59 which engage the lower surfaces of ramp sections 44, 46.

An operating cylinder 61, such as a pneumatic ram, is affixed to cross member 31 at the front of the framework and connected to axle housing 57 by an operating rod 62. When the operating rod is in the extended position illustrated in FIG. 4, wheels 58, 59 are positioned toward the top of ramp 41, and the framework is in its level position. When the rod is in its retracted position, the wheels are positioned toward the bottom of ramp 41, and the framework is in the tilted position illustrated.

A main carriage 64 is mounted on framework 20 and movable between an extended position toward the front of the framework and a retracted position toward the rear of the framework. This carriage comprises upward facing axially elongated U-shaped channel members 66, 67 and a platform 68 affixed to the inner legs of the channel members, with the lateral margins of the platforms overhanging portions of the channel members. Flanges 69, 71 depend from the channel members, and wheels 72 are rotatively mounted on shafts 73 which extend from the flanges. Wheels 72 are constrained for rotation between the vertically spaced pairs of rails to permit rolling movement of the carriage on the framework. As best illustrated in FIG. 3, two wheels are provided on each side of the carriage, and these wheels are spaced apart to prevent rotation of the carriage relative to the framework. A ramp 74 extends forwardly and downwardly from the front of platform 68.

A second carriage 78 is mounted on the main carriage and movable between an advanced position toward the front of the main carriage and a retracted position toward the rear of the main carriage. Carriage 76 comprises a platform 77 with depending lateral flanges 78, 79. Rollers or wheels 81 are rotatively mounted on shafts 82 which extend from flanges 78, 79. Two such rollers are provided on each side of the carriage, and these rollers engage channel members 66, 67 and platform 68 to permit rolling movement between the two carriages.

A fork assembly 84 is mounted on carriage 76 and adapted to carry a slab-like susceptor 86. The fork assembly comprises a base 87 having depending lateral flanges 88, 89 and a pair of forwardly extending fork members 91, 92 positioned to engage the lateral margins of the susceptor. The fork assembly is mounted on carriage 76 by means of parallel arms 93 which permit the fork assembly to swing between an advanced position forward of the carriage and a retracted position above the carriage.

The fork assembly also includes wheels 94 which are rotatively mounted on an axle 96. This axle is carried by a U-shaped bracket 97 mounted on the underside of base 87. When carriage 84 is in its retracted position, wheels 94 engage the upper surface of platform 68 and hold the fork assembly in its retracted or raised position. When carriage 76 is in is fully advanced position, wheels 94 rest toward the bottom of ramp 74, and the fork assembly is in its advanced or lowered position.

Means is provided for moving the carriages between their advanced and retracted positions. This means includes a drive chain 101 trained about sprockets 102, 103. Sprocket 102 is an idler sprocket which is rotatively mounted on a shaft 104 carried by a U-shaped mounting bracket 106 affixed to platform 49 toward the front of framework 20. Sprocket 103 is affixed to the output shaft of a reversible drive motor and transmission assembly 108. A drive connection between main carriage 64 and chain 101 is provided by a dog 109 which is pivotally mounted to the carriage and extends rearwardly therefrom. Toward its rear end, the dog is provided with a notch 111 adapted to receive a drive pin 112 which extends laterally from chain 101. The length of the dog is such that the notch is positioned for engaging and disengaging the drive pin as it passes about the rear of sprocket 103 with carriage 64 in its fully retracted position. The dog also includes a second notch 113 which is adapted to receive a stationary pin 114 affixed to the framework to retain the main carriage in its retracted position.

A drive connection is provided between the second carriage 76 and drive chain 101 by means of a depending lug 116 which engages a second laterally extending drive pin 117 on the chain. Lug 116 is affixed to platform 77, and it passes through an axially elongated slot 118 which is provided in platform 68 of the main carriage 64. The relative positions of lug 116 and drive pin 117 are such that the drive pin engages and leaves the lug at sprocket 102 when the second carriage is in its fully advance position.

Motor and transmission assembly 108 is affixed to a mounting bracket 121 which is mounted on a mounting plate 122 by bolts 123. The upper portion of plate 122 is pivotally mounted on the rear cross member 32 of framework 20 by means of pivot pins 124. Compression springs 126 urge the lower portion of plate 122 away from cross member 32 and tend to maintain tension in the drive chain.

A limit switch 128 deenergizes the drive motor in the event that the motor mount moves more than a predetermined distance relative to the framework. Such movement might, for example, occur in the event that the susceptor somehow becomes askew on the fork assembly and strikes the reactor tube, thereby increasing the tension in the lower run of the chain to a level greater than that determined by the compressive force of springs 126.

The output shaft of drive motor and transmission assembly 108 is connected to a cam assembly 131 which actuates limit switches 132–135. An additonal limit switch 136 is mounted on framework 20 in position to be actuated by a susceptor on fork assembly 84 and thereby determine the presence or absence of a susceptor on the assembly. As discussed more fully hereinafter, the cam assembly and limit switches control the operation of the apparatus and program it for automatically delivering a susceptor to the reactor chamber or automatically retrieving a susceptor from the chamber. A removable cover 138 forms an enclosure for the drive motor and cam assemblies.

Operation and use of the loading apparatus can be described with reference to FIGS. 9A–9G which illustrate the apparatus in conjunction with a horizontally extending reactor tube 141 having an opening 142. A sled 143 and transversely extending rods 144 are disposed within the tube for supporting the susceptor at an inclined position.

Figure 9A:
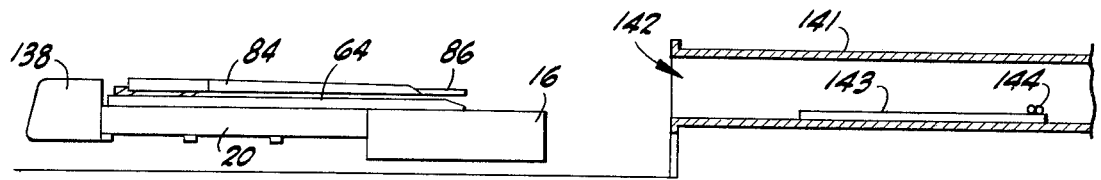
FIGS. 9A–9G are diagramatic side elevational views of the embodiment of FIG. 1, illustrating the operation of the apparatus.

At the outset of the loading cycle, as illustrated in FIG. 9A, carriages 64 and 76 are both in their fully retracted positions, fork assembly 84 is in its retracted position, and susceptor 86 is positioned on forks 91, 92 of the fork assembly. It is assumed that a plurality of semiconductor wafers are placed on the upper surface of the susceptor.

Figure 9B:
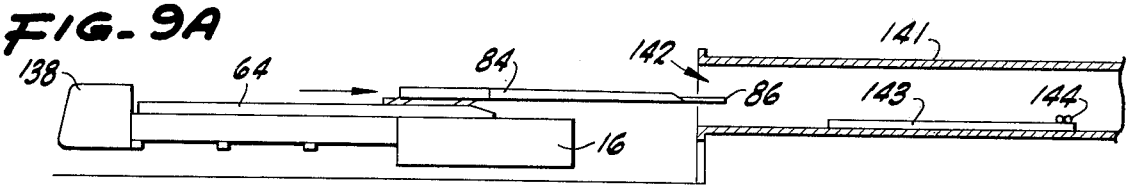

During the loading cycle, motor 108 drives chain 101 in the forward direction, i.e. with the upper run of the chain moving toward the reactor tube. During the initial portion of the cycle, lug 116 engages drive pin 117, and carraige 76 and fork assembly 84 advance toward the reactor, as illustrated in FIG. 9B. As carriage 76 approaches its fully advanced position, wheels 94 run down ramp 74, and the fork assembly swings to its advanced position. When carriage 76 reaches its fully advanced position, drive pin 117 leaves lug 116 and continues on around sprocket 102.

Figure 9C:
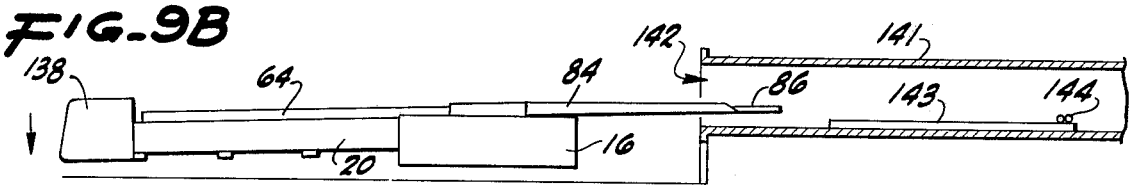

As wheels 94, run down ramp 74 and cylinder 61 are actuated to draw wheel assembly 56–59 down ramp 41, thereby tilting the framework to raise the forks, as illustrated in FIG. 9C.

Shortly after drive pin 117 leaves lug 116, drive pin 112 engages notch 111 in dog 109. The dog is thereby lifted to disengage notch 113 from pin 114, and carriage 64 begins to move toward its advanced position.

Figure 9D:
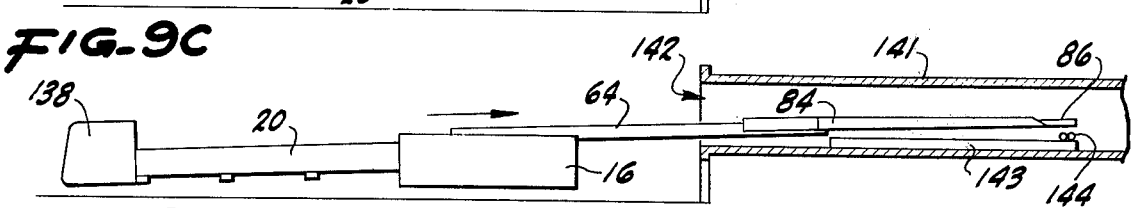
Figure 9E:
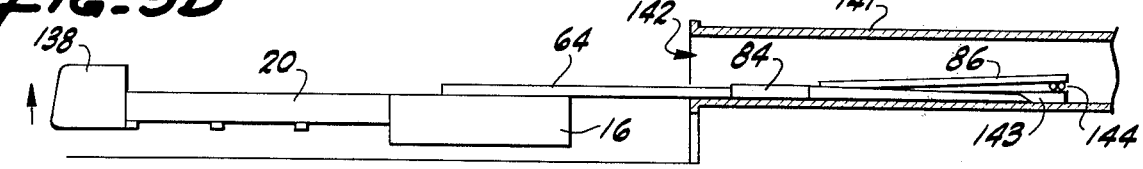

When the main carriage 64 reaches its fully advanced position, as illustrated in FIG. 9D, the drive motor is deenergized, and cylinder 61 is actuated to move wheel assembly 56–59 up ramp 41, thereby returning the framework to its level position and lowering the fork assembly. As the fork assembly is lowered, susceptor 86 is placed on sled 143 and rods 144, as illustrated in FIG. 9E.

Figure 9F:
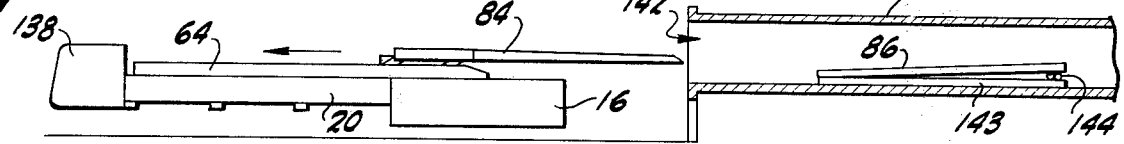
Figure 9G:
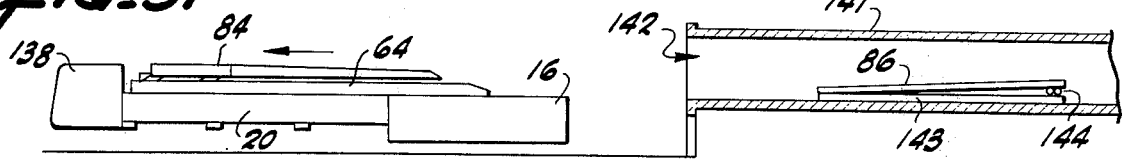

After the susceptor is placed on the sled, drive motor 108 is actuated to drive chain 101 in the reversed direction, and carriage 64 is returned to its retracted position, as illustrated in FIG. 9F. When the carriage reaches the fully retracted position, drive pin 112 leaves notch 111 and dog 109 swings downwardly, with retaining pin 114 being received in notch 113. Thereafter, drive pin 117 reengages lug 116, and carriage 76 begins moving toward its retracted position. As this movement begins, wheels 94 move up ramp 74 onto platform 68, and the fork assembly swings up to its retracted position, as illustrated in FIG. 9F. When carriage 76 reaches its fully retracted position, as illustrated in FIG. 9G, the drive motor is deenergized.

The unloading operation is the converse of the loading operation. Carriages 64, 76 and fork assembly 84 all begin in their fully retracted positions, with susceptor 86 in the reactor tube, as illustrated in FIG. 9G. When the drive motor is energized, carriage 76 and fork assembly 84 move forward to their advanced positons, as illustrated in FIG. 9F, and thereafter carriage 64 moves to its advanced position, as illustrated in FIG. 9E. With both carriages in their advanced positions, framework 20 is tilted, as illustrated in FIG 9D, and the fork assembly lifts the susceptor off the sled. Carriage 64 is then returned to its retracted position, as illustrated in FIG. 9C, and the framework is returned to its level position, as illustrated in 9B. Thereafter, carriage 76 and fork assembly 84 are returned to their fully retracted positions, as illustrated in FIG. 9A.

Figure 10:
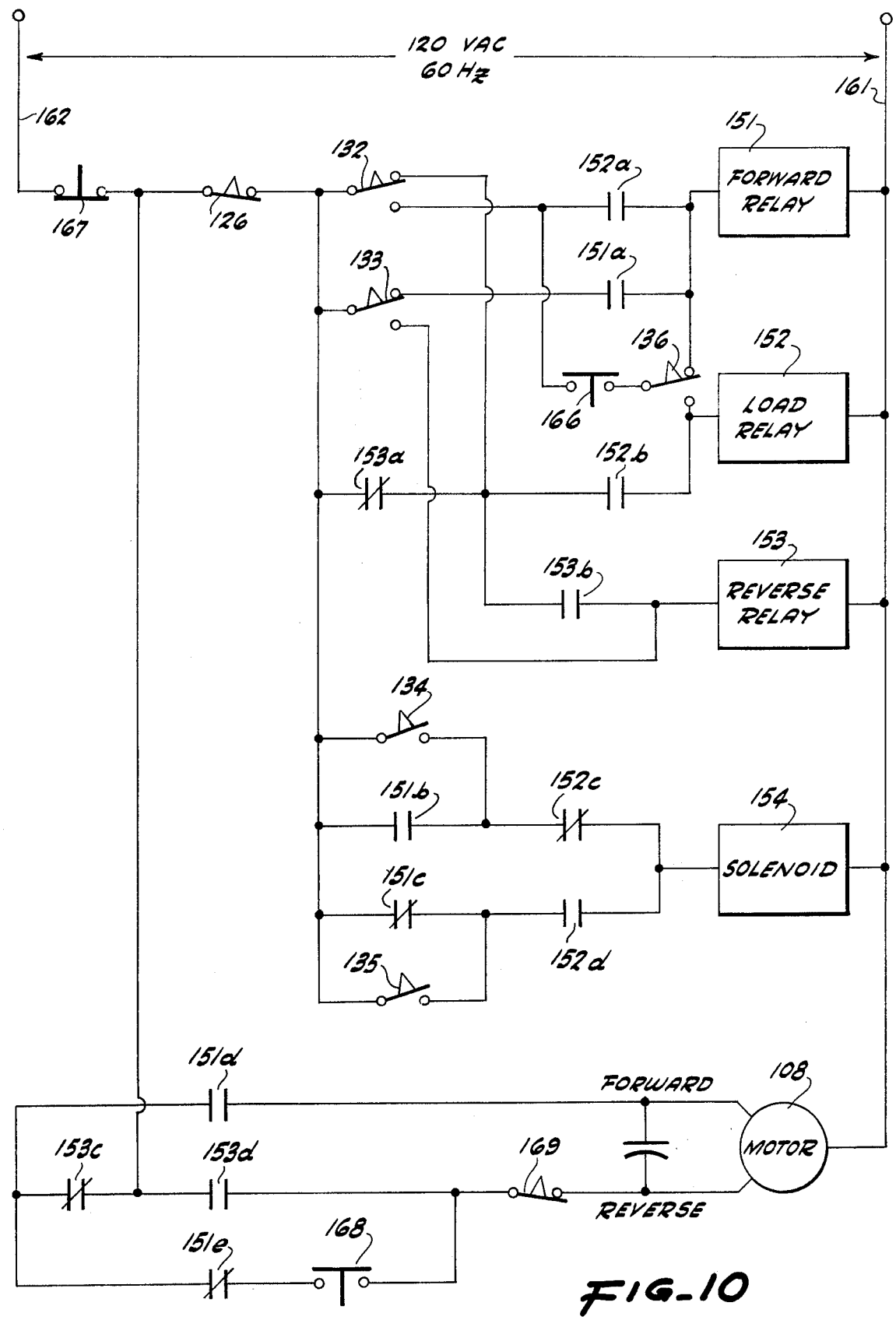
FIG. 10 is a circuit diagram of a control system for the apparatus of FIG. 1.

A control system for the loading apparatus is shown schematically in FIG. 10. As will appear more fully hereinafter, the control system serves to automatically program the apparatus for either the loading cycle or the unloading cycle according to the presence or absence of a susceptor on the fork assembly, as determined by switch 136.

The control system includes relays 151–153 and a solenoid 154 which controls the operation of cylinder 61. The relays are mounted on chassis 156, 157 provided toward the sides of base 16. Removable covers 158, one of which is shown in FIG. 2, cover the sides of the base and enclose the relays. When solenoid 154 is energized, wheel assembly 56–59 is at the top of ramp 41, and the framework is in its level position. Each of the relays includes an operating coil and contacts controlled thereby, and relay 153 is a time delay relay which, in the preferred embodiment, is adjusted to provide a delay on the order of 0.1 to 10 seconds between energization and actuation of that relay.

Limit switches 126, 136 and cam actuated switches 132–135 are also part of the control system. Overload switch 126 is a normally closed single pole switch which opens only in the event of an overload on the drive chain. Cam actuated switch 132 is a 2-position switch which remains in a first position, as illustrated, except when both carriages are in their fully retracted positions. Cam actuated switch 133 is likewise a 2-position switch, and it remains in a first position, as illustrated, except when both carriages are in their fully advanced positions. Cam actuated switch 134 is a single pole switch which opens as fork assembly wheels 94 reach the bottom of ramp 74 as the fork assembly advances toward the reactor tube. This switch closes when the wheels start to move up the ramp as the fork assembly is retracted. Cam operated switch 135 is likewise a single pole switch which opens when wheels 94 reach the top of ramp 74 as the fork assembly advances. This switch closes when the wheels reach the top of the ramp as the fork assembly is retracted. Cam actuated switch 136 is a 2-position switch which is in a first position, as illustrated, except when carriage 76 is in its retracted position and a susceptor is present on the fork assembly.

Operating power for the apparatus and control system is obtained from a suitable source such as 120 volt, 60 Hz alternating current provided by line conductors 161, 162. One side of the operating coils of relays 151–153 and solenoid 154 is connected to conductor 161, as is one side of the winding of motor 108.

Controls are provided for initiating and stopping the operation of the apparatus and for resetting the apparatus and control system in the event of a malfunction or other interruption in the normal cycle of operation. These controls include a normally open START switch 166, a normally closed emergency STOP switch 167 and a normally open RESET switch 168. These switches are all mounted on cover 138 and are accessible externally of the motor housing.

START switch 166 provides means for energizing either relay 151 or 152 depending upon the position of susceptor sensing switch 136. Once energized, relay 151 can receive holding current through switch 133 and normally open contacts 151a of that relay. This relay can also be energized through switch 132 and normally open contact 152a of relay 152. Once energized, relay 152 can receive holding current through normally open contacts 152b and either switch 132 or normally closed contacts 153a of relay 153.

Relay 153 is initially energized by actuation of switch 133, and thereafter it can receive holding current through switch 132 and normally open contacts 153b of relay 153.

Solenoid 154 can be energized by current through normally closed relay contacts 152c and either normally open contacts 151b of relay 151 or switch 134. The solenoid can also be energized by current through normally open contacts 152d of relay 152 and either normally closed contacts 151c of relay 151 or switch 135.

Motor 108 is energized for operation in the forward direction by current passing through normally closed contacts of 153c of relay 153 and normally open contacts 151d of relay 151. The motor is energized for operation in the reverse direction by current through normally open contacts 153d of relay 153. The motor can also be energized for operation in the reverse direction by current through normally closed contacts 153c of relay 153, normally closed contacts 151e of relay 151, and reset switch 168. A normally closed limit switch 169 is connected in series with reset switch 168 to deenergize the motor upon completion of a reset cycle. This limit switch is mounted on mounting plate 122 and positioned to be actuated by carriage 76 when carriages 64 and 76 are both in their fully retracted positions.

Operation and use of the control system can now be described. Initially, it is assumed that carriages 64 and 76 are both in their retracted position and that a susceptor is positioned on fork assembly 84. At the outset, relays 151-153 are all deenergized, and solenoid 154 is energized through closed cam actuated switch 134 and relay contacts 152c. When START switch 166 is depressed, relay 152 is energized through susceptor sensing switch 136, and thereafter holding current is supplied to relay 152 through contacts 153a and 152b. When relay 152 is energized, contacts 152a close, energizing relay 151. Thereafter holding current is supplied to relay 151 by switch 133 and contacts 151a. Energizing relay 152 also causes contacts 152d to close, and thereafter solenoid 154 is energized through switch 135 and contacts 152d.

The energization of relay 151 closes contacts 151d, energizing motor 108 in the forward direction. When fork assembly wheels 94 reach the top of ramp 74, switch 135 opens, deenergizing solenoid 154 to tilt the framework and raise the susceptor. The motor remains energized until carriage 76 reaches its fully advanced position, at which time switch 133 is actuated to remove the holding current from relay 151 and deenergize the motor. Relay 152 remains energized, and solenoid 154 is reenergized through contacts 151c and 152d to return the framework to the level position and lower the susceptor onto the sled in the tube.

A predetermined time after switch 133 is actuated, relay 153 is energized, and thereafter this relay receives holding current through switch 132 and contacts 153b. Relay 152 is held energized by switch 132 and relay contacts 152b. With relay 153 energized, contacts 153d are closed, and motor 108 is energized in the reverse direction. When both carriages reach their fully retracted positions, switch 132 is actuated to remove the holding current from relays 152 and 153, and the motor is energized.

At the outset of an unloading cycle, all of the relays are deenergized, and solenoid 154 is energized via switch 134 and contacts 152c to maintain the framework in the level position. When START switch 166 is depressed, relay 151 is energized through susceptor sensor switch 136, and thereafter this relay receives holding current through switch 133 and contacts 151a. Relays 152 and 153 remain deenergized and solenoid 154 remains energized by current through contacts 151b and 152c throughout the movement of the carriages toward their advanced positions.

When the carriages reach their fully advanced positions, switch 133 is actuated, removing the holding current from relay 151. With this relay deenergized, contacts 151b open, and solenoid 154 is deenergized, tilting the framework to lift the susceptor off the sled.

Following actuation of switch 133 and the tilting of the framework, relay 133 is energized through switch 133, and the motor is energized through contacts 153d for operation in the reverse direction. Once energized, relay 153 receives holding current through switch 132 and contacts 153b.

When wheels 194 begin to move up ramp 74, switch 134 closes, energizing solenoid 154 to return the framework to its level position. When the carriages reach their fully retracted positions, switch 132 is actuated, removing the holding current from relay 153, and the motor is deenergized.

In the event that emergency STOP switch 167 is opened, power to the remainder of the control is interrupted. The forks tilt to their raised position, and the power remains off as long as the switch is depressed. When the switch is relaesed, the forks will remain in their raised position if they are inside the reactor tube, and they will return to the level position if they are outside the tube. Thereafter, the carriages must be returned to their retracted positions by closing RESET switch 168.

In the event of an overload, switch 126 opens, removing the power from relays 151-153 and solenoid 154. The forks tilt to their raised positions, and the carriages must be moved to their retracted positions by depressing RESET switch 168.

In the event of an emergency stop, an overload stop, or a power failure, the carriages must be returned to their fully retracted positions before either a load or unload cycle can be restarted. RESET switch 168 must be held closed during the reset operation until the operation is terminated by the opening of limit switch 169. In retracting in this mode, the forks will always raise if they are within the tube. When wheels 194 begin to move up ramp 74, switch 134 closes, energizing solenoid 154 to return the framework to the level position.

If desired, the loading apparatus can be utilized with a reactor having more than one tube or chamber. For example, with a reactor having vertically separated reaction tubes, the loading apparatus can be mounted on an elevator assembly in front of the reactor and moved into alignment with a desired tube. Alternately, for reactors having two horizontally aligned reaction chambers, the loading apparatus can be mounted on horizontally aligned guides for movement in alignment with a desired reaction chamber.

The invention has a number of important features and advantages. By mechanizing the loading and unloading of horizontal tube reactors, it assures accurate placement of a susceptor in a reactor chamber without frictional contact with the reactor tube. Moreover, the apparatus is suitable for use in an automated semiconductor processing system. Although described with specific reference to horizontal tube reactors, the apparatus can also be utilized for carrying objects into and out of other chambers having openings of restricted height.

It is apparent from the foregoing that a new and improved loading apparatus has been provided. While only the preferred embodiment has been described, as will be apparent to those familiar with the art, certain changes and modifications can be made without departing from the scope of the invention as defined by the following claims.

What is claimed is:

1. In apparatus for transporting an object into or out of a chamber having an opening of limited height through which the object can pass:
   A. a base mounted in a predetermined position outside the chamber;
   B. an axially elongated framework mounted on the base generally in alignment with the opening in the chamber;
   C. a first carriage mounted on the framework and movable between advanced and retracted axial positions;
   D. a second carriage mounted on the first carriage and movable axially between advanced and retracted positions relative to the first carriage for receiving the object and carrying the same between a position outside the chamber in which the first and second carriages are both in their retracted positions and a position inside the chamber in which both carriages are in their advanced position; and
   E. an axially extending fork assembly mounted on the second carriage for engaging the object to carry the same;
   F. the framework being pivotally mounted to the base to permit movement of the fork assembly between raised and lowered positions when the second carriage is in a predetermined position.

2. In apparatus for transporting an object into or out of a horizontally extending chamber having an opening of limited height through which the object can pass:
   A. a base mounted in a predetermined position outside the chamber;
   B. an elongated framework pivotally mounted on the base for movement about a horizontal axis and having rails extending rearwardly from the base away from the chamber;
   C. a drive chain rotatively mounted on the framework and extending longitudinally thereof;
   D. a first carriage mounted on the framework with wheels engaging the rails to permit movement of the carriage between an advanced position toward the chamber and a retracted position away from the chamber;
   E. a second carriage supported by the first carriage and movable between advanced and retracted positions relative thereto;
   F. a fork assembly mounted on the second carriage and extending forwardly for engaging the object to be transported;
   G. reversible motive means for driving the chain in forward and reverse directions when actuated;
   H. means for releasably connecting the first and second carriages to the drive chain whereby the carriages are moved between their advanced and retracted positions when the motive means is activated; and
   I. means for moving the framework between first and second pivotal positions relative to the base to move the fork assembly between raised and lowered positions.

3. The apparatus of claim 2 wherein the framework includes laterally spaced pairs of vertically spaced apart rails, the wheels of the first carriage being constrained for rotation between the rails in the respective pairs.

4. The apparatus of claim 2 wherein the second carriage is mounted on the first carriage by rollers.

5. The apparatus of claim 2 further including parallel arms mounting the fork assembly on the second carriage and permitting swinging movement of the fork assembly between an advanced position in front of the carriage and a retracted position above the carriage, together with means for moving the fork assembly to its retracted position when the second carriage is in its retracted position.

6. The apparatus of claim 5 wherein the means for moving the fork assembly to its retracted position includes a roller on the fork assembly positioned to engage an upwardly inclined ramp toward the front of the first carriage.

7. The apparatus of claim 2 wherein the motive means is mounted on the framework by means permitting relative motion between the motive means and framework in the event that the force exerted on the drive chain exceeds a predetermined level, together with means responsive to the relative motion for deactivating the motive means in the event of an excessive force on the chain.

8. The apparatus of claim 2 further including a cam driven by the motive means and switches actuated by the cam for controlling operation of the motive means and the means for moving the framework to move the fork assembly between raised and lowered positions.

9. The apparatus of claim 2 further including means for sensing the presence of the object on the fork assembly and programming the motive means and the means for moving the framework for operation in a first predetermined sequence in the presence of the object and in a second predetermined sequence in the absence of the object.

10. The apparatus of claim 2 wherein the means for moving the framework between first and second pivotal positions includes relatively inclined ramps carried by the base and framework, roller means engaging the ramps, and means for moving the roller means relative to the ramps between first and second positions corresponding to the first and second pivotal positions.

11. The apparatus of claim 10 wherein the means for moving the roller means comprises a fluid operated actuator.

12. In apparatus for transporting an object into or out of a chamber having an opening of limited height through which the object can pass:
   A. a base mounted in a predetermined position outside the chamber;
   B. an axially elongated framework mounted on the base generally in alignment with the opening in the chamber;

C. a first carriage mounted on the framework and movable between advanced and retracted axial positions;
D. a second carriage mounted on the first carriage and movable axially between advanced and retracted positions relative to the first carriage for receiving the object and carrying the same between a position outside the chamber in which the first and second carriages are both in their retracted positions and a position inside the chamber in which both carriages are in their advanced positions;
E. a fork assembly for engaging the object to carry the same;
F. parallel arms mounting the fork assembly on the second carriage to permit swinging movement on the fork assembly between an advanced position in front of the carriage and a retracted position above the carriage; and
G. means for moving the fork assembly to its retracted position when the second carriage is in its retracted position.

13. In apparatus for transporting an object into or out of a chamber having an opening of limited height through which the object can pass:
A. a base mounted in a predetermined position outside the chamber;
B. an axially elongated framework mounted on the base generally in alignment with the opening in the chamber;
C. a first carriage mounted on the framework and movable between advanced and retracted axial positions;
D. a second carriage mounted on the first carriage and movable axially between advanced and retracted positions relative to the first carriage for receiving the object and carrying the same between a position outside the chamber in which the first and second carriages are both in their retracted positions and a position inside the chamber in which both carriages are in their advanced positions;
E. an axially extending fork assembly mounted on the carriage for engaging the object to carry the same;
F. motive means for moving the carriages between their advanced and retracted positions;
G. means for sensing the presence of the object on the fork assembly; and
H. means for conditioning the motive means for moving the carriages and fork assembly in a first predetermined sequence in the presence of the object and in a second predetermined sequence in the absence of the object.

* * * * *